United States Patent
Kasada et al.

(10) Patent No.: US 9,773,519 B2
(45) Date of Patent: Sep. 26, 2017

(54) MAGNETIC TAPE WITH SPECIFIC SERVO PATTERN EDGE SHAPE AND MAGNETIC TAPE DEVICE USING SAME

(71) Applicant: FUJIFILM Corporation, Tokyo (JP)

(72) Inventors: Norihito Kasada, Minami-ashigara (JP); Tetsuya Kaneko, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/388,864

(22) Filed: Dec. 22, 2016

(65) Prior Publication Data

US 2017/0186460 A1   Jun. 29, 2017

(30) Foreign Application Priority Data

Dec. 25, 2015  (JP) ................ 2015-254192

(51) Int. Cl.
  *G11B 5/78*  (2006.01)
  *G11B 5/70*  (2006.01)
  *G11B 5/592*  (2006.01)

(52) U.S. Cl.
  CPC ............ *G11B 5/78* (2013.01); *G11B 5/5928* (2013.01); *G11B 5/70* (2013.01)

(58) Field of Classification Search
  CPC .............. G11B 5/70; G11B 5/74; G11B 5/78
  USPC .................................................... 360/134
  See application file for complete search history.

(56) References Cited

U.S. PATENT DOCUMENTS

| | | | |
|---|---|---|---|
| 5,689,384 A | 11/1997 | Albrecht et al. | |
| 9,495,985 B2 * | 11/2016 | Biskeborn | G11B 5/584 |
| 2008/0144211 A1 * | 6/2008 | Weber | G11B 5/584 360/77.12 |
| 2008/0174897 A1 * | 7/2008 | Bates | G11B 5/584 360/48 |
| 2009/0161249 A1 * | 6/2009 | Takayama | G11B 5/584 360/77.12 |
| 2010/0000966 A1 * | 1/2010 | Kamata | G11B 5/855 216/22 |
| 2013/0286510 A1 * | 10/2013 | Rothermel | G11B 5/78 360/134 |
| 2014/0139944 A1 * | 5/2014 | Johnson | G11B 5/584 360/75 |
| 2015/0043101 A1 * | 2/2015 | Biskeborn | G11B 5/00817 360/52 |
| 2016/0260449 A1 * | 9/2016 | Ahmad | G11B 5/584 |

* cited by examiner

*Primary Examiner* — Jefferson Evans
(74) *Attorney, Agent, or Firm* — Sughrue Mion, PLLC (57) ABSTRACT

The magnetic tape has a magnetic layer containing ferromagnetic powder and binder on a nonmagnetic support, wherein the coercive force measured in the longitudinal direction of the magnetic tape is less than or equal to 167 kA/m, a timing-based servo pattern is present on the magnetic layer, and the edge shape specified by observing the timing-based servo pattern with a magnetic force microscope is a shape in which the difference between the value $L_{99.9}$ of the 99.9% cumulative distribution function of the width of misalignment from the ideal shape in the longitudinal direction of the magnetic tape and the value $L_{0.1}$ of the 0.1% cumulative distribution function, $L_{99.9}-L_{0.1}$, is less than or equal to 180 nm.

20 Claims, 5 Drawing Sheets

MAGNETIC TAPE WITH SPECIFIC SERVO PATTERN EDGE SHAPE AND MAGNETIC TAPE DEVICE USING SAME

CROSS-REFERENCE TO RELATED APPLICATIONS

This application claims priority under 35 U.S.C 119 to Japanese Patent Application No. 2015-254192 filed on Dec. 25, 2015. The above application is hereby expressly incorporated by reference, in its entirety.

BACKGROUND OF THE INVENTION

Field of the Invention

The present invention relates to a magnetic tape and a magnetic tape device.

Discussion of the Background

Magnetic recording media include tape-shaped media and disk-shaped media. Magnetic recording media in the form of tapes, that is, magnetic tapes, also referred to simply as "tapes" hereinafter, are primarily employed in storage applications such as data-back and archiving. A magnetic signal is normally recorded on the data band of a magnetic tape when recording information on a magnetic tape. Thus, a data track is formed on a data band running in the longitudinal direction.

With the immense increase in the amount of information in recent years, higher recording capacities (increased recording capacity) have been demanded of magnetic tapes. One way of increasing recording capacity is to increase the recording density by narrowing, the width of each data track and disposing more data tracks in the width direction of the magnetic tape.

However, when the width of the data track is narrowed and the magnetic tape is run within a drive to record and/or reproduce a magnetic signal, positional fluctuation in the direction of width of the magnetic tape makes it difficult for the magnetic head to accurately follow the data track, which tends to cause errors during recording and/or reproduction. Accordingly, a system employing a head tracking servo based on a servo signal (referred to hereinafter as a "servo system") has been proposed and put into practice in recent years as a way to reduce the generation of such errors (for example, see U.S. Pat. No. 5,689,384, which is expressly incorporated herein by reference in its entirety.).

SUMMARY OF THE INVENTION

Among servo systems, in those servo systems based on the magnetic servo method, a servo signal (servo pattern) is formed on the magnetic layer of the magnetic tape and the servo pattern is magnetically read to conduct head tracking. This is described in greater detail below.

First, the servo signal that has been formed on the magnetic layer is read by a servo head. Next, based on the servo signal that has been read, the position of the magnetic head in the direction of width of the magnetic tape is controlled to cause the magnetic head to follow the data track. Thus, when running a magnetic tape within a drive to record or reproduce a signal on a magnetic tape, even when the position of the magnetic tape fluctuates in the direction of width relative to the magnetic head, it is possible to cause the magnetic head to follow the data track. This makes it possible to accurately record information on a magnetic tape and/or accurately reproduce information that has been recorded on a magnetic tape.

Timing-based servo systems have been widely, employed in recent years as servo systems based on the above magnetic servo system. In a servo system based on a timing-based servo system (also referred to hereinafter as a "timing-based servo system"), multiple servo patterns of two or more different shapes are formed on the servo band. Two or more servo patterns of different shape are formed on the servo band, and the position of the servo head is identified with the time interval at which two servo patterns of different shape being read (reproduced) and the time interval at which two servo patterns of identical shape are being reproduced. The position of the magnetic head in the direction of width of the magnetic tape is then controlled based on the position of the servo head thus identified.

One magnetic characteristic of a magnetic tape is coercive force. As the trend of using ferromagnetic powder of small particle size for the ferromagnetic powder contained in the magnetic layer has intensified in recent years in order to increase the recording density, there has been a tendency for the coercive force of magnetic tapes to decrease. However, in extensive research conducted by the present inventors, when the coercive force of a magnetic tape drops in conventional timing-based systems, a conventionally unknown phenomenon has been determined to occur whereby the precision with which the magnetic head follows the data track (referred to hereinafter as the "head positioning precision") tends to drop.

An aspect of the present invention provides for means for enhancing the head positioning precision of a timing-based servo system in a magnetic tape with low coercive force.

An aspect of the present invention relates to a magnetic tape having a magnetic layer containing ferromagnetic powder and binder on a nonmagnetic support, wherein the coercive force measured in the longitudinal direction of the magnetic tape (also referred to hereinafter simply as the "coercive force" or "Hc") is less than or equal to 167 kA/m (less than or equal to 2,100 Oe);

a timing-based servo pattern is present the magnetic layer; and the edge shape specified by observing the timing-based servo pattern with a magnetic force microscope is a shape in which the difference between the value $L_{9.99}$ of the 99.9% cumulative distribution function of the width of misalignment from the ideal shape in the longitudinal direction of the magnetic tape and the value $L_{0.1}$ of the 0.1% cumulative distribution function, $L_{99.9}-L_{0.1}$, is less than or equal to 180 nm.

In the present invention and the present specification, the coercive force is given based on the unit conversion equation 1 Oe (1 Oersted)=79.6 A/m. In the present specification, the longitudinal direction of the magnetic tape will sometimes be referred to as simply the longitudinal direction or the longitudinal direction of the tape, and the direction of width of the magnetic tape will, sometimes be referred to simply as the direction of width or the direction of width of the tape. In the present invention and the present specification, the "direction of width" means a direction perpendicular to the longitudinal direction.

In the present invention and the present specification, the term "timing-based servo pattern" refers to a servo pattern permitting head tracking in a timing-based servo system. With regard to a servo pattern permitting head tracking in a timing-based servo system, a servo pattern recording head (also called a servo write head) forms multiple servo patterns of two or more different shapes on the servo band. In one example, the multiple servo patterns of two or more different shapes are continuous for multiple servo patterns of identical shape, and are disposed at regular intervals. In another example, servo patterns of different types are disposed in alternating fashion. With regard to servo patterns of identical shape, positional shifting of the edge shape of the servo pattern is ignored. The shapes and positioning on the servo band of servo patterns permitting head tracking in timing-based servo systems are well known. Specific forms will be described further below. Timing-based servo patterns will also be referred to simply as servo patterns hereinafter. In the present invention and present specification, the edge shape specified by magnetic force microscope observation of the timing space servo pattern is the edge (side edge) shape positioned downstream from the direction of running (also referred to simply as the "running direction" or "tape running direction" hereinafter) of the magnetic tape during recording of a magnetic signal (information).

In the present invention and present embodiment, the edge shape specified by magnetic force microscope observation of the timing-based servo pattern; the difference between the value $L_{99.9}$ of the 99.9% cumulative distribution function of the width of misalignment from the ideal shape in the longitudinal direction of the magnetic tape and the value $L_{0.1}$ of the 0.1% cumulative distribution function $L_{99.9}$–$L_{0.1}$; and the ideal shape will be described.

The example of a linear servo pattern running continuously in the direction of width from one side of the magnetic tape to the other and inclined by an angle θ relative to the direction of width of the magnetic tape will be primarily described below. This angle θ is the angle formed between the direction of width of the magnetic tape and a line segment connecting two spots along the edges in the direction of width of the tape positioned downstream in the running direction of the magnetic tape during magnetic signal (information) recording of a servo pattern. This point will be further elaborated upon below.

Figure 1:
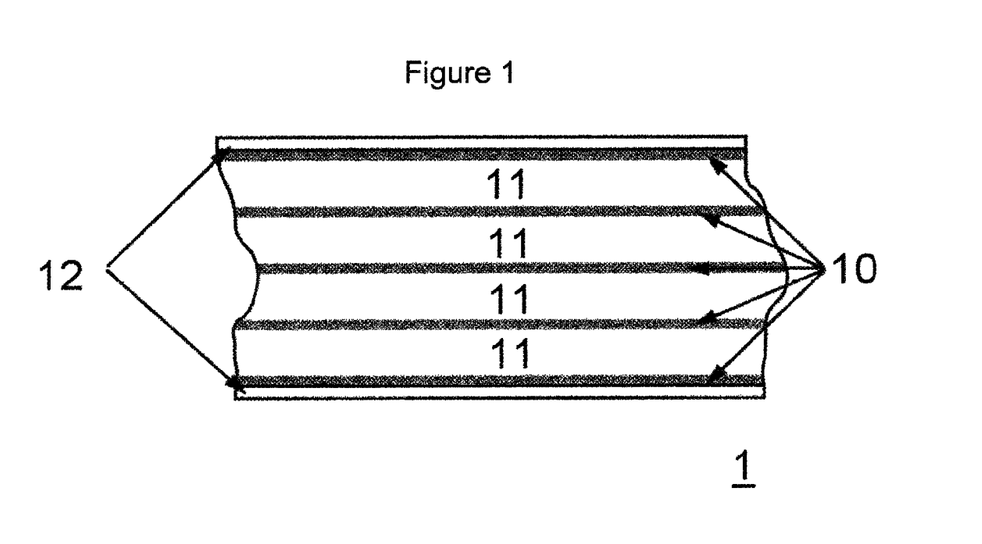
FIG. 1 shows an example of the configuration of the data band and servo band.
Figure 2:
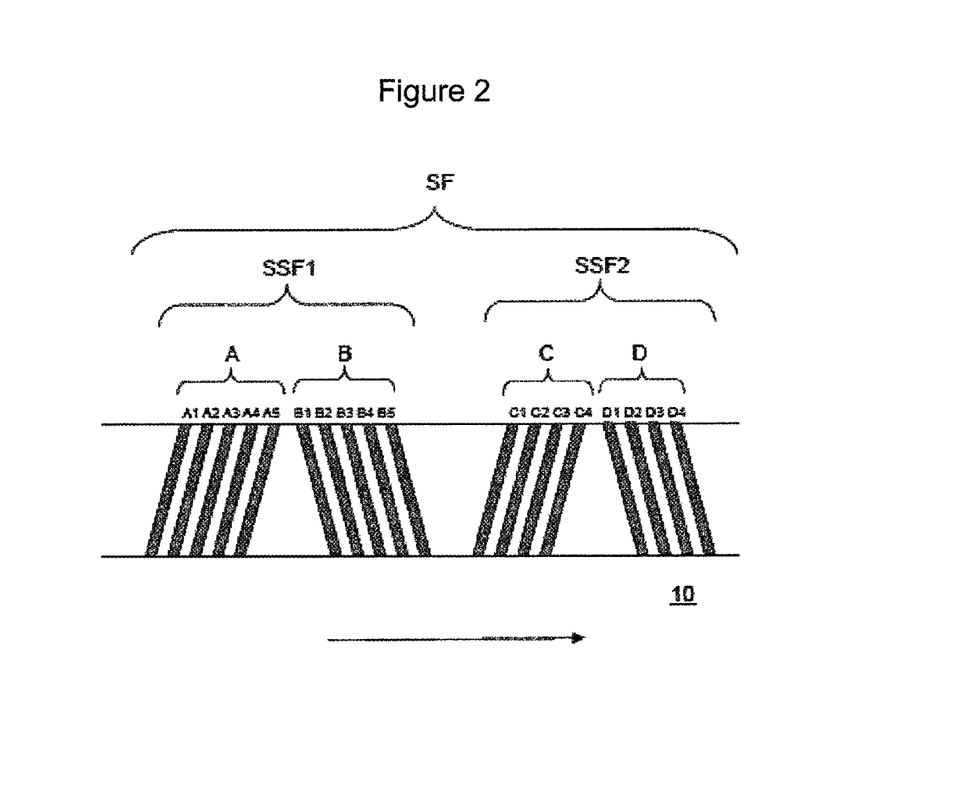
FIG. 2 shows an example of the servo pattern configuration of a tape of LTO Ultrium format.

For example, in linear tape-open (LTO), a linear recording system is employed. In a linear recording system, multiple regions (called as "servo bands") on which servo patterns have been formed are normally present on the magnetic layer in the longitudinal direction of the magnetic tape. The region sandwiched between two servo bands is called as a data band. Information (magnetic signal) is recorded on the data band. Multiple data tracks are formed in the longitudinal direction in each data band. FIG. 1 shows an example of the configuration of the data bands and servo bands. In FIG. 1, multiple servo bands 10 and multiple data bands 11 are disposed between guide bands 12 on the magnetic layer of magnetic tape 1. The servo bands are magnetized regions that are formed by a servo write head by magnetizing specific regions on the servo band. The regions that have been magnetized by the servo head (positions where the servo pattern is formed) are determined by standards. For example, in an LTO Ultrium formatted tape, which is an industry standard, during the manufacturing of a magnetic tape, multiple servo patterns inclined relative to the direction of width of the tape as shown in FIG. 2 are formed on the servo hand. More specifically, the servo frame SF on data band 10 in FIG. 2 is comprised of a servo subframe 1 (SSF1) and a servo subframe 2 (SSF2). Servo subframe 1 is comprised of A bursts (symbol A in FIG. 2) and B bursts (symbol B in FIG. 2). The A bursts are comprised of servo patterns A1 to A5, and the B bursts are comprised of servo patterns B1 to B5. Additionally, servo subframe 2 is comprised of C bursts (symbol C in FIG. 2) and D bursts (symbol D in FIG. 2). The C bursts are comprised of servo patterns C1 to C4, and the D bursts are comprised of servo patterns D1 to D4. Eighteen such servo patterns are arranged in a 5,5,4,4 array of sets of 5 and 4 in a subframe, and used to identify servo frames. FIG. 2 shows one servo flame. However, multiple servo frames are disposed in the tape running direction in each data band. The arrow in FIG. 2 denotes the tape running direction.

Figure 3:
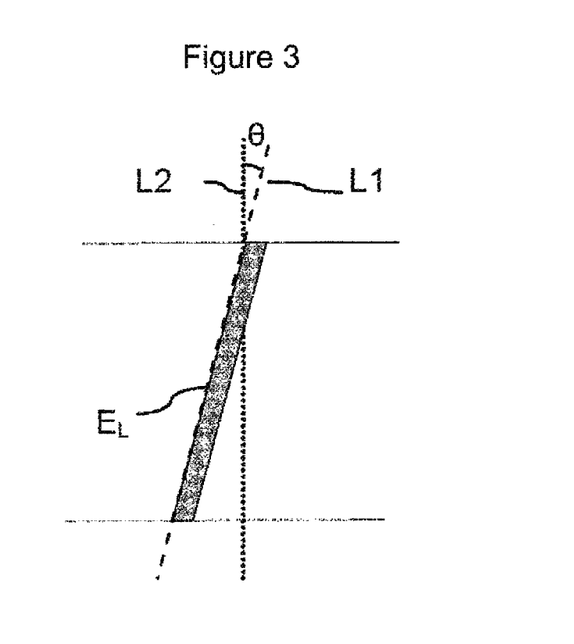
FIG. 3 is a descriptive drawing of angle θ.
Figure 4:
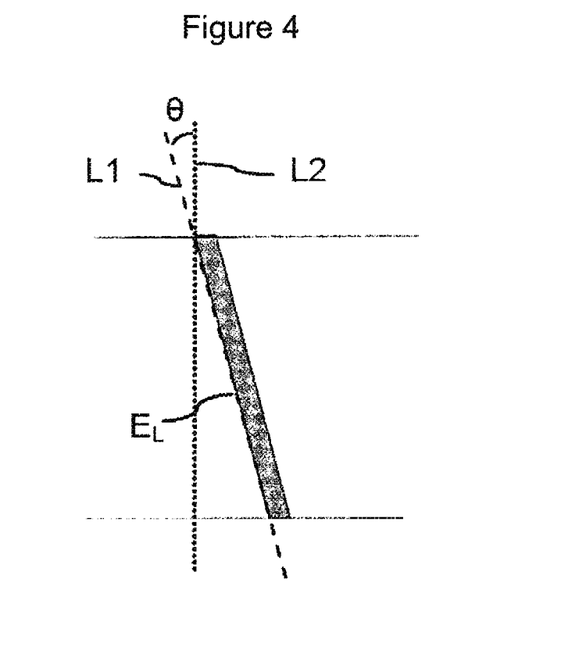
FIG. 4 is a descriptive drawing of angle θ.

FIGS. 3 and 4 are descriptive drawings of angle θ. Angle θ is the angle formed by a segment (broken line L1 in FIG. 3) connecting two spots along edge $E_L$ on the downstream side in the servo pattern shown in FIG. 2 relative to the direction of width of the tape (broken line L2 in FIG. 3) for servo patterns inclined toward the upstream side of the running direction such as servo patterns A1 to A5 and C1 to C4. Further, for servo patterns inclined toward the downstream side of the running direction, such as servo patterns B1 to B5 and D1 to D4, angle θ is the angle formed between the segment (broken line L1 in FIG. 4) connecting two spots on edge $E_L$ on the downstream side and the direction of width of the tape (broken line L2 in FIG. 4). This angle θ is generally referred to as an "azimuth angle," and is determined by setting the servo write head during the formation of magnetized regions (servo patterns) on the servo band.

Figure 5:
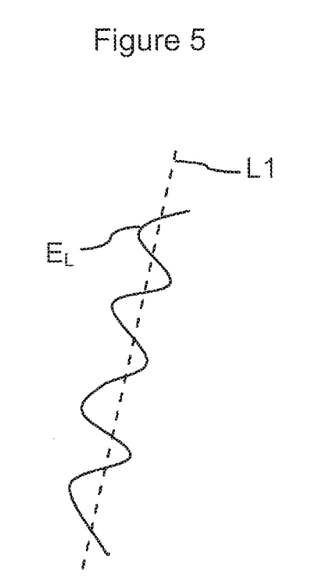
FIG. 5 shows an example of the edge shape of a servo pattern.

In the course of forming magnetized regions (servo patterns) on the servo band, when the servo band is formed in an ideal manner, the edge shape of the servo pattern inclined by angle θ relative to the direction of width of the magnetic tape matches the shape of the segment (broken line L1 in FIGS. 3 and 4) connecting two spots on the edge portion. That is, it is a straight one. Accordingly, at various spots on the edge, the width of misalignment from the ideal shape in the longitudinal direction of the magnetic tape (also referred to simply as the "misalignment width") becomes zero. However, based on extensive research conducted by the present inventors, in magnetic tapes in which the coercive force measured in the longitudinal direction is less than or equal to 167 kA/m, as shown in the example of FIG. 5, there is a substantial tendency for the edge shape of the servo pattern to end up shifting from the ideal shape. It is thought that when this misalignment width is quite large and variation in the value of the misalignment width at the various spots along the edge is substantial, a drop in the head positioning precision of the timing-based servo system results. In magnetic tapes in which the coercive force measured in the longitudinal direction is less than or equal to 167 kA/m, the reasons for the strong tendency for the edge shape of the servo pattern to shift from the ideal shape is presumed by the present inventors to lie in that a reversal in magnetization tends to occur due to the low coercive force. More specifically, it is presumed that unintended spots tend to be magnetized due to the magnetic field from the servo write head as a result of the low coercive force. In this regard, it is conceivable to increase the capacity of the servo write head, specifically, to use a servo write head with a powerful magnetic field (leakage magnetic field), to prevent the edge shape of the servo pattern from shifting from the ideal shape. However, based on extensive research by the present inventors, it has become clear that there is a limit to how close the edge shape of the servo pattern can be brought to the ideal shape by just increasing the capacity of the servo write head in a magnetic tape in which the coercive force measured in the longitudinal direction is less than or equal to 167 kA/m. Accordingly, the present inventors conceived of the idea of causing the edge shape of the servo pattern to approach the ideal shape by means of the properties of the magnetic tape on which the servo pattern is formed. They conducted further extensive research into the properties of magnetic tapes. As a result, they discovered that it was possible to form a servo pattern with an edge shape approaching the ideal shape in a magnetic tape with coercive force measured in the longitudinal direction of less than or equal to 167 kA/m, and thus enhance the head positioning precision of a timing-based servo system. The above magnetic tape was devised on that basis.

The above difference of $L_{99.9}-L_{0.1}$ is a value that can serve as an indicator of low variation in the value of the misalignment width at various edge positions and of a low misalignment shift in the servo pattern from the ideal shape at various edge positions. $L_{99.9}-L_{0.1}$ is a value obtained based on the following method.

The surface of the magnetic layer of a magnetic tape on which a servo pattern has been formed is observed with a magnetic force microscope (MFM). The measurement range includes five servo patterns. For example, in an LTO Ultrium formatted tape, the measurement range can be set to 90 $\mu m \times 90$ $\mu m$ to observe five servo patterns of A bursts or B bursts. The servo pattern (magnetized region) is extracted by (coarsely) measuring the measurement range at a pitch of 100 nm. In the present invention and the present specification, the term "surface of the magnetic layer" is used synonymously with the surface of the magnetic tape on the magnetic layer side.

Subsequently, in order to detect the boundary between the magnetized region and the unmagnetized region in the edge positioned downstream from the running direction, measurement of the servo pattern is conducted at a 5 nm pitch in the vicinity of the boundary to obtain a magnetic profile. When the magnetic profile that has been obtained is tilted by an angle $\theta$ relative to the direction of width of the magnetic tape, a rotational correction is made (to achieve $\theta=0°$) along the direction of width of the magnetic tape using analytic software. Subsequently, analytic software is used to calculate the coordinates of the position of the peak value of each profile measured at a 5 nm pitch. The position coordinates of each peak value indicate the position of the boundary of the magnetized region and the unmagnetized region. By way of example, position coordinates can be specified in an x-y coordinate system with the x coordinate denoting the running direction and they coordinate denoting the direction of width.

Taking the example of the case where the ideal shape is a straight line, and the coordinates of a position on the line of the ideal shape are given by $(x, y)=(a, b)$, if the edge shape actually obtained (coordinates of the above boundary) snatches the ideal shape, the calculated coordinates are $(x, y)=(a, b)$, in this case, the misalignment width is zero. By contrast, if the actual edge shape obtained has shifted from the ideal shape, the x coordinate of the position where $y=b$ of the boundary becomes $x=a+c$ or $x=a-c$. The term "$x=a+c$" is the case where there is a shift on the upstream side relative to the running direction of width c, and the term "$x=a-c$" is the case where there is a shift on the downstream side relative to the running direction of the width c (that is, $-c$ a when the upstream side is adopted as reference). Here, c is the misalignment width. That is, the absolute value of the misalignment width of the x coordinate from the ideal shape is the misalignment width from the ideal shape in the longitudinal direction of the magnetic tape. Thus, misalignment widths are obtained at various edge positions on the downstream side in the running direction based on measurements obtained at a 5 nm pitch.

Based on values obtained from various servo patterns, a cumulative distribution function is obtained by analytic software. Based on the cumulative distribution function obtained, the value $L_{99.9}$ of 99.9% of the cumulative distribution function and the value $L_{0.1}$ of 0.1% are obtained, and the difference $L_{99.9}-L_{0.1}$ is obtained for the various patterns from the values obtained.

The above measurement is conducted for three different measurement ranges (number of measurements N=3).

The arithmetic average of the difference $L_{99.9}-L_{0.1}$ obtained for the various servo patterns is defined as difference $L_{99.9}-L_{0.1}$ for the magnetic tape.

The term "ideal shape" of the edge shape of the servo pattern in the present invention and the present specification refers to the edge shape when the servo pattern is formed without misalignment. For example, in one embodiment, the servo pattern is a linear servo pattern continuously or discontinuously running from one side to the other in the direction of width of the magnetic tape. The term "linear" as relates to the servo pattern refers to the pattern shape without curved portions irrespective of misalignment of the edge shape. The term "continuously" means running from one side to the other in the direction of width of the tape without an inflection point in the angle of incline and without a break. The servo pattern shown in FIG. 2 is an example of a servo pattern continuously running from one side to the other side in the direction of width of the magnetic tape. By contrast, the term "discontinuous" means running with one or more inflection points in the angle of incline and/or one or more breaks. Shapes that extend without a break but with an inflection point in the angle of incline are so-called polygonal line shapes. The servo pattern shown in FIG. 3 is an example of a discontinuous servo pattern running from one side to the other side in the direction of width of the tape without a break but with one inflection point in the angle of incline. The servo pattern shown in FIG. 4 is an example of a discontinuous servo pattern running from one side to the other in the direction of width that is broken at one point but has no inflection point in the angle of incline. And the servo pattern shown in FIG. 5 is an example of a discontinuous servo pattern running from one side to the other side in the direction of width of the tape and having one break and one inflection point in the angle of incline.

Figure 6:
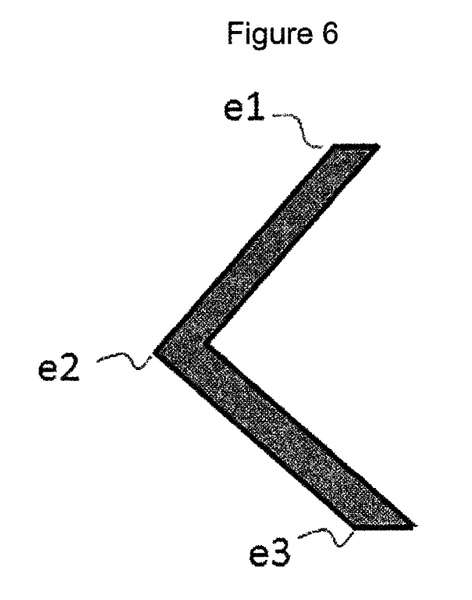
FIG. 6 shows an example of the edge shape of a servo pattern.
Figure 7:
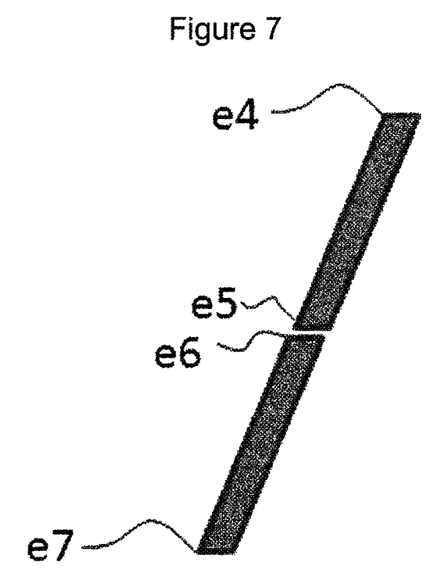
FIG. 7 shows an example of the edge shape of a servo pattern.
Figure 8:
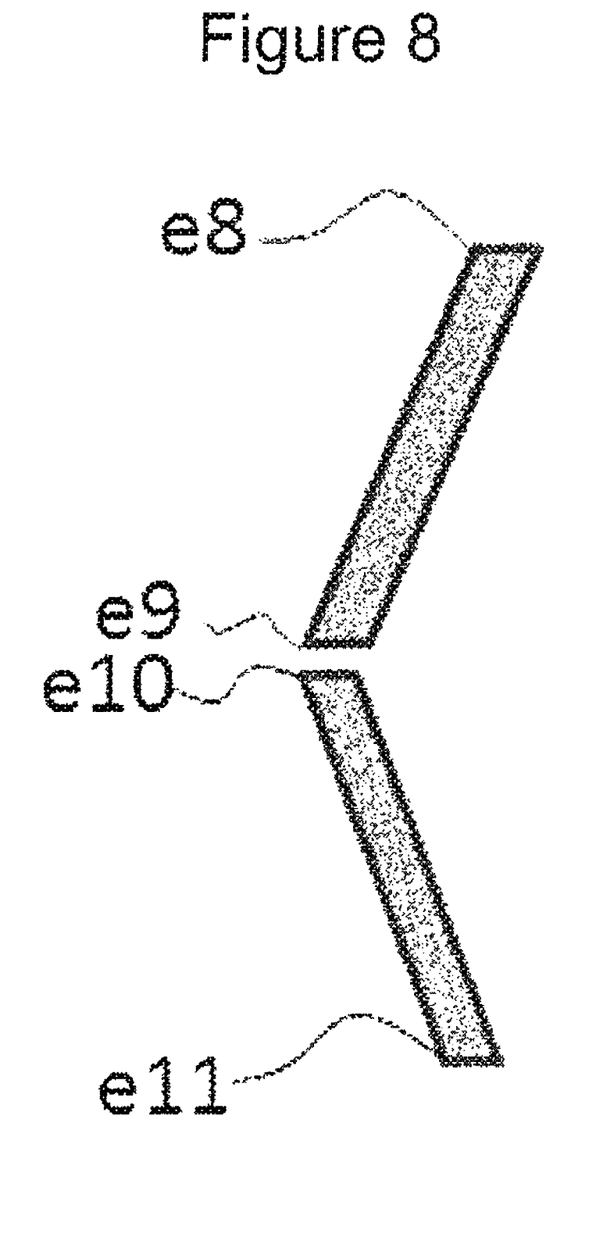
FIG. 8 shows an example of the edge shape of a servo pattern.

In linear servo patterns running continuously from one side to the other in the direction of width of the tape, the term "ideal shape" as relates to the edge shape is the shape (linear shape) of a segment joining two spots on the edge on the downstream side in the direction of running of a linear servo pattern. For example, for the linear servo pattern shown in FIG. 2, it is the shape of the straight line indicated by L1 in FIGS. 3 and 4. Additionally, with regard to linear servo patterns running discontinuously, the term "ideal shape" is the shape (linear shape) of a segment joining one edge to the other edge of portions with identical angles of incline as regards a shape with an inflection point in the angle of incline. For a shape extending with breaks in one or more spots, it is the shape (linear shape) of a portion joining one edge to the other edge in various portions extending continuously. For example, it is the segment joining e1 and e2, and the segment joining e2 and e3, in the servo pattern shown in FIG. 6. In the servo pattern shown in FIG. 7, it is the segment joining e4 and e5, and the segment joining e6 and e7. In the servo pattern shown in FIG. 8, it is the segment joining e8 and e9, and the segment joining e10 and e11.

Examples of linear servo patterns have been set forth above. However, the servo pattern can be one in which the ideal shape of the edge is a curved shape. For example, for a servo pattern in which the ideal edge shape on the downstream side relative to the direction of running is an arc shape, difference $L_{99.9}-L_{0.1}$ can be obtained from the misalignment width obtained from the position coordinates obtained by a magnetic force microscope for the edge shape on the downstream side in the running direction for the position coordinates of the partial arc.

A commercial magnetic force microscope, or one of known configuration, can be used in frequency modulation (FM) for the above measurements. A magnetic force microscope probe in the form of an SSS-MFMR (nominal curvature radius 15 nm) made by Nanoworld, for example, can be employed. The distance between the tip of the probe and the surface of the magnetic layer during magnetic force microscope observation falls within a range of 20 nm to 50 nm.

Further, commercial analytic software or analytic software incorporating a known computational equation can be employed as the above analytic software.

In one embodiment, the above timing-based servo pattern is a linear servo pattern inclined by an angle θ relative to the direction of width and running continuously from one side to the other side in the direction of width of the magnetic tape. Further, the ideal shape is a linear shape running in a direction of angle θ. The servo pattern shown in FIG. 2 is an example of this embodiment.

In one embodiment, the ΔSFD (also referred to simply as the "ΔSFD" hereinafter) calculated with Equation 1:

$$\Delta SFD = SFD_{25°\,C.} - SFD_{-190°\,C.} \quad \text{Equation 1}$$

in the longitudinal direction of the above magnetic tape is less than or equal to 0.50. In Equation 1, $SFD_{25°\,C.}$ denotes the switching field distribution (SFD) measured in the longitudinal direction of the magnetic tape in an environment with a temperature of 25° C., and the $SFD_{-190°\,C.}$ denotes the switching field distribution (SFD) measured in the longitudinal direction of the magnetic tape in an environment with a temperature of −190° C. The "SFD" means switching field distribution.

The present inventors conducted extensive research into the ΔSFD. As a result, they made the unprecedented discovery of a correlation between the ΔSFD and difference $L_{99.9}-L_{0.1}$. Keeping the ΔSFD to less than or equal to 0.50 is one good way to control the difference $L_{99.9}-L_{0.1}$ so that it remains less than or equal to 180 nm. The ΔSFD is a value indicating the dependence on temperature of the switching field distribution SFD measured in the longitudinal direction of the magnetic tape. The lower the value, the smaller the change in the SFD due to temperature, and the higher the value, the greater the change in the SFD due to temperature that is signified. The longitudinal direction STD of the magnetic tape can be determined by a known magnetic characteristic measuring device such as a vibrating sample magnetometer. The same applies to measurement of the SFD of a ferromagnetic powder, described farther below. The temperature during SFD measurement can be adjusted by setting the measurement device.

Based on research conducted by the present inventors, trends (A) to (C) below are observed with regard to the ΔSFD. The reason that difference $L_{99.9}-L_{0.1}$ can be reduced by keeping the ΔSFD to less than or equal to 0.50 is presumed to be that the magnetization of unintended spots during magnetization (servo pattern formation) by the servo write head can be inhibited. However, the details remain unclear.

(A) The greater the dispersion of ferromagnetic powder in the magnetic layer, the lower the value becomes;
(B) The lower the temperature dependency of the SFD of the ferromagnetic powder employed, the lower the value becomes;
(C) The greater the degree to which the ferromagnetic powder is aligned in the longitudinal direction of the magnetic layer (the greater the degree of orientation in the longitudinal direction), the lower the value becomes, and the lower the degree of orientation in the longitudinal direction, the greater the value becomes.

In one embodiment, the ΔSFD is greater than or equal to 0.03 but less than or equal to 0.50.

In one embodiment, the coercive force is greater than or equal to 119 kA/m but less than or equal to 167 kA/m.

A further aspect of the present invention relates to a magnetic tape device including the above magnetic tape, a magnetic head, and a servo head.

An aspect of the present invention can provide a magnetic tape in which a servo pattern is formed and in which the head positioning precision during running in a drive based on a timing-based servo system is enhanced, as well as a magnetic tape device recording and/or reproducing a magnetic signal on this magnetic tape.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

Magnetic Tape

The magnetic tape according to an aspect of the present invention is a magnetic tape having a magnetic layer containing ferromagnetic powder and binder on a nonmagnetic support, wherein the coercive force measured in the longitudinal direction of the magnetic tape is less than or equal to 167 kA/m (less than or equal to 2,100 Oe), a timing-based servo pattern is present on the magnetic layer, and the edge shape specified by observing the timing-based servo pattern with a magnetic force microscope is a shape in which the difference between the value $L_{99.9}$ of the 99.9% cumulative distribution function of the width of misalignment from the ideal shape in the longitudinal direction of the magnetic tape and the value $L_{0.1}$ of the 0.1% cumulative distribution function, $L_{99.9}-L_{0.1}$, is less than or equal to 180 nm.

The above magnetic tape will be described in greater detail below. The description in the present specification contains presumptions by the present inventors. The present invention is not to be construed as being limited by these presumptions.

<Coercive Force>

The coercive force measured in the longitudinal direction of the above magnetic tape is less than or equal to 167 kA/m. Research by the present inventors has revealed that the phenomenon of a drop in positioning precision that is not seen in magnetic tapes in which the coercive force exceeds 167 kA/m occurs in magnetic tapes in which the coercive force is less than or equal to 167 kA/m. The presumptions of the present inventors in this regard are as set forth above. This drop in positioning precision can be inhibited by controlling the difference $L_{99.9}-L_{0.1}$ so that it remains within the range set forth above. This point will be described in greater detail further below. The coercive force Hc can be, for example, less than or equal to 160 kA/m, less than or equal to 155 kA/m, or less than or equal to 150 kA/m. However, so long as it is less than or equal to 167 kA/m, it can exceed these upper limits given by way of example. From the perspective of retaining the information recorded on the magnetic tape, the coercive force is, for example, greater than or equal to 119 kA/m, greater than or equal to 120 kA/m, or greater than or equal to 130 kA/m. The coercive force measured in the longitudinal direction of the magnetic tape can generally be controlled by means of the coercive force of the ferromagnetic powder contained in the magnetic layer.

<Difference $L_{99.9}-L_{0.1}$>

The methods of measuring and calculating the difference $L_{99.9}-L_{0.1}$ of a timing-based servo pattern present on a magnetic tape are as set forth above. The fact that in a magnetic tape with a coercive force of less than or equal to 167 kA/m, keeping the difference $L_{99.9}-L_{0.1}$ to less than or equal to 180 nm can enhance the head positioning precision in a timing-based servo system was discovered by the present inventors based on extensive research.

Difference $L_{99.9}-L_{0.1}$ is less than or equal to 180 nm. Difference $L_{99.9}-L_{0.1}$ can be, for example, less than or equal to 170 nm, less than or equal to 160 nm, less than or equal to 150 nm, less than or equal to 140 nm, less than or equal to 130 nm, less than or equal to 120 nm, less than or equal to 110 nm, or less than or equal to 100 nm. However, so long as the difference $L_{99.9}-L_{0.1}$ is less than or equal to 180 nm, the head positioning precision of a timing-based servo system can be enhanced in a magnetic tape with a coercive force of less than or equal to 167 kA. Accordingly, so long as the difference $L_{99.9}-L_{0.1}$ is less than or equal to 180 nm, the above limits given by way of example can be exceeded. The difference $L_{99.9}-L_{0.1}$ can be, for example, greater than or equal to 50 nm, greater than or equal to 60 nm, or greater than or equal to 70 nm. However, in the same manner as above, so long as the difference $L_{99.9}-L_{0.1}$ is less than or equal to 180 nm, a value falling below these lower limits given by way of example is possible. The difference $L_{99.9}-L_{0.1}$ can be controlled, for example, by means of the $\Delta$SFD of the magnetic tape and by the type of servo write head (specifically, the leakage magnetic field) employed to form the servo pattern. It is difficult to achieve a difference $L_{99.9}-L_{0.1}$ that is less than or equal to 180 nm just by increasing the capacity of the servo write head (specifically, employing a servo write head with a large leakage magnetic field). By contrast, keeping the $\Delta$SFD to less than or equal to 0.50, for example makes it possible to achieve a difference $L_{99.9}-L_{0.1}$ that is less than or equal to 180 nm.

<$\Delta$SFD>

In the above magnetic tape, the $\Delta$SFD is desirably less than or equal to 0.50. By way of example, the $\Delta$SFD can be less than or equal to 0.45, less than or equal to 0.40, less than or equal to 0.35, less than or equal to 0.30, less than or equal to 0.25, or less than or equal to 0.20. By way of example, the $\Delta$SFD can be greater than or equal to 0.03 or greater than or equal to 0.05.

However, so long as the $\Delta$SFD is less than or equal to 0.50, a difference $L_{99.9}-L_{0.1}$ of less than or equal to 180 nm can be readily achieved. Thus, it becomes possible to increase the head positioning precision in a timing-based servo system in a magnetic tape with a coercive force of less than or equal to 167 kA/m. This fact was discovered by the present inventors.

Based on research by the present inventors, the $\Delta$SFD could be controlled by the method used to prepare the magnetic tape and the tendencies (A) to (C) described above were observed.

For example, as regards (A), examples are intensifying the dispersion conditions (lengthening the dispersion period, reducing the diameter and increasing packing of the dispersion beads used in dispersion, and the like) and using a dispersing agent. Known dispersing agents, commercial dispersing agents, and the like can be used without limitation as the dispersing agent.

Additionally, as an example of (B), the ferromagnetic powder—in which the difference $\Delta$SFD$_{powder}$ between the SFD as measured in an environment with a temperature of 100° C. and the SFD as measured in an environment with a temperature of 25° C. as calculated with Equation 2 below falls within a range of 0.05 to 1.50 can be employed. However, even outside the above range, $\Delta$SFD can be kept within the range of greater than or equal to 0.50.

$$\Delta\text{SFD}_{powder}=\text{SFD}_{powder\ 100°\ C.}-\text{SFD}_{powder\ 25°\ C.} \quad \text{Equation 2}$$

(In Equation 2, $SFD_{powder\ 100°\ C.}$ denotes the switching field distribution SFD of the ferromagnetic powder as measured in an environment with a temperature of 100° C. and $SFD_{powder\ 25°\ C.}$ denotes the switching field distribution SFD of the ferromagnetic powder as measured in an environment with a temperature of 25° C.)

As regards (C), there is a tendency that the ΔSFD becomes small when the orientation processing of the magnetic tape is conducted by longitudinal orientation. There is a tendency that the ΔSFD becomes large when the orientation processing of the magnetic tape is conducted by vertical orientation processing or no orientation processing is conducted.

Accordingly, for example, by employing one of means (A) to (C) above, or any combination of two or more thereof, to control these factors, it is possible to obtain a magnetic tape in which the ΔSFD calculated with Equation 1 is less than or equal to 0.50.

Keeping the ΔSFD to less than or equal to 0.50 is an example of a desirable way to keep difference $L_{99.9}$–$L_{0.1}$ to less than or equal to 180 nm. Any tape having a magnetic layer containing ferromagnetic powder and binder on a nonmagnetic support, in which the magnetic layer has one or more timing-based servo patterns, for example, the magnetic layer has one or more data bands and one or more servo bands running in the longitudinal direction of the magnetic tape, having one or more timing-based servo patterns on the servo bands, in which the coercive force is less than or equal to 167 kA/m, and in which difference $L_{99.9}$–$L_{0.1}$ is less than or equal to 180 nm, as well as a magnetic tape in which the ΔSFD exceeds 0.50, is included in the magnetic tape according to one aspect of the present invention.

The above magnetic tape will be described in greater detail below.

<Magnetic Layer>
(Ferromagnetic Powder)

The magnetic layer contains ferromagnetic powder and binder. Various powders that are commonly employed as ferromagnetic powder in the magnetic layers of magnetic recording media such as magnetic tapes can be employed as the ferromagnetic powder. The use of ferromagnetic powder of small average particle size is desirable from the perspective of enhancing the recording density of the magnetic tape. To that end, the ferromagnetic powder with an average particle size of less than or equal to 50 nm is desirably employed. From the perspective of the stability of magnetization, the ferromagnetic powder with an average particle size of greater than or equal to 10 nm is desirably employed.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and the present specification, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss.

The method described in paragraph 0015 of Japanese Unexamined Patent Publication (KOKAI) No. 2011-048878, which is expressly incorporated herein by reference in its entirety, far example, can be employed as the method of collecting sample powder such as ferromagnetic powder from a magnetic layer for particle size measurement.

In the present invention and the present specification, the size of the particles constituting, powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of diameter/thickness or height). For the definition of (3), the average particle size is the average diameter (also called the average particle diameter).

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The content (fill rate) of ferromagnetic powder in the magnetic layer desirably falls within a range of 50 weight % to 90 weight %, preferably within a range of 60 weight % to 90 weight %. A high fill rate is desirable from the perspective of increasing recording density.

<Binder, Curing Agent>

The above magnetic tape is a particulate magnetic tape. The magnetic layer contains ferromagnetic powder and binder. The various resins that are commonly employed as binders in particulate magnetic recording media can be employed as the binder. Examples of binders are: polyurethane resin, polyester resin, polyamide resin, vinylchloride resin, styrene, copolymerized acrylic resin of acrylonitrile, methyl methacrylate, and the like; nitrocellulose and other cellulose resin; epoxy resin; phenoxy resin; and polyvinyl acetal, polyvinyl butyral, and other polyvinyl alkyral resin. These can be employed singly, or multiple resins can be mixed for use. Of these, polyurethane resin, acrylic resin, cellulose resin, and vinylchloride resin are desirable. These resins can also be employed as binders in the nonmagnetic layer and backcoat layer described further below. Reference can be made to Japanese Unexamined Patent Publication (KOKAI) No. 2010-24113, paragraphs 0028 to 0031, with regard to these resins. The content of the above publication is expressly incorporated herein by reference in its entirety. The average molecular weight of resins that are employed as binders is, by way of example, greater than or equal to 10,000 and less than or equal to 200,000 as a weight average molecular weight. The weight average molecular weight in the present invention and present specification is a value that is obtained by measurement by gel permeation chromatography (GPC) and converted to a polystyrene equivalent. Examples of measurement conditions are given below. The weight average molecular weights given in Examples further below are values obtained by measurement under the following measurement conditions and converted to polystyrene equivalents.

GPC device: HLC-8120 (made by Tosoh Corp.)
Column: TSK gel Multipore HXL-M (7.8 mm inner diameter (ID)×30.0 cm, made by Tosoh Corp.)
Fluent: Tetrahydrofuran (THF)

A curing agent can be employed along with the above resins employed as binders. The curing agent can be a thermosetting compound—a compound in which a curing reaction (crosslinking reaction) progresses when heated—in one embodiment. In another embodiment, the curing agent can be a photo-curable compound—a compound in which a curing reaction (crosslinking reaction) progresses when irradiated with light. Thermosetting compounds are desirable as curing agents; polyisocyanate is suitable. Reference can be made to Japanese Unexamined Patent Publication 2011-216149, paragraphs 0124 and 0125, far details regarding polyisocyanate. In the magnetic layer-forming composition, the curing agent can be employed, for example, in a quantity of 0 to 80.0 weight parts per 100.0 weight parts of binder. From the perspective of enhancing coating strength, a curing agent can be added in a quantity of 50.0 to 80.0 weight parts for use.

(Additives)

Ferromagnetic powder and binder are contained in the magnetic layer. The magnetic layer can also contain one or more additives as needed. An example of an additive is the above curing agent. By having the curing agent undergo a curing reaction in the process of forming the magnetic layer, at least a portion of the curing agent can be contained in the magnetic layer in a form where it has reacted (crosslinked) with another component, such as the binder. Examples of additives that can be incorporated into the magnetic layer are nonmagnetic fillers, lubricants, dispersing agents, dispersion adjuvants, antifungal agents, antistatic agents, oxidation inhibitors, and carbon black. Nonmagnetic filler is synonymous with nonmagnetic powder. In the present invention and the present specification, the term nonmagnetic powder means an aggregation of multiple nonmagnetic particles. The term aggregation is not limited to forms in which the particles are in direct contact, but includes forms in which binder, an additive, or the like is present between the particles. The term particle is sometimes used to denote powder. These points also apply to various powders in the present invention and the present specification. Examples of nonmagnetic fillers are nonmagnetic fillers capable of functioning as protrusion-forming agents forming protrusions that suitably protrude from the surface of the magnetic layer (referred to as "protrusion-forming agents" hereinafter) and nonmagnetic fillers capable of functioning as abrasives (referred to as "abrasives" hereinafter). The protrusion-forming agents are components that can contribute to controlling the frictional characteristics of the surface of the magnetic layer. Either a protrusion-forming agent or an abrasive is desirably contained in the magnetic layer of the above magnetic tape. It is also desirable for both to be contained. Additives can be employed in the form of suitable quantities of commercial products or additives manufactured by known methods.

[Nonmagnetic Layer]

The nonmagnetic layer will be described next. In the above magnetic tape, a magnetic layer can be present directly on the nonmagnetic support, or a nonmagnetic layer containing nonmagnetic powder and binder can be present between the nonmagnetic support and the magnetic layer. The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably fails within a range of 50 weight % to 90 weight %, preferably within a range of 60 weight % to 90 weight %.

Known techniques can be applied to the nonmagnetic layer with regard to the binder, additives, and other details relating to the nonmagnetic layer. For example, known techniques relating to the magnetic layer can be applied to the quantity and type of binder and the quantity and type of additives.

The nonmagnetic layer in the present invention and the present specification may be in the form of an essentially nonmagnetic layer containing small quantities of ferromagnetic powder, either in the form of impurities or by intention, for example, along with nonmagnetic powder. The term "essentially nonmagnetic layer" refers to a layer with a residual magnetic flux density of less than or equal to 10 mT, a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

<Nonmagnetic Support>

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

<Various Thicknesses>

The thicknesses of the various layers and nonmagnetic support in the above magnetic tape are as follows. The thickness of the nonmagnetic support is desirably 3.0 μm to 80.0 μm. The thickness of the magnetic layer can be normally optimized based on the bandwidth of the recording signal, the length of the head gap, and the degree of saturation magnetization of the magnetic head employed in recording. The thickness of the magnetic layer can be generally 10 nm to 150 nm, desirably 20 nm to 120 nm, and preferably, 30 nm to 100 nm. It suffices for the magnetic layer to be comprised of a single layer. It can also be divided into two or more layers having different magnetic characteristics, and a known magnetic multilayer configuration can be applied.

The thickness of the nonmagnetic layer is, for example, 0.1 μm to 3.0 μm, desirably 0.1 μm to 2.0 μm, and preferably, 0.1 μm to 1.5 μm.

The thickness of the various layers and nonmagnetic support of the magnetic tape can be determined by known film thickness measurement methods. As an example, the cross section of the magnetic tape in the direction of thickness can be exposed by a known method such as an ion beam or microtome, and the exposed cross section can be observed by a scanning electron microscope. The various thicknesses can be determined as the thickness determined at one spot in the direction of thickness, or as the arithmetic average of the thicknesses obtained at multiple spots, such as two or more randomly extracted spots. The thickness of the various layers can also be determined as the design thickness calculated from the manufacturing conditions.

<Backcoat Layer>

The magnetic tape can contain a backcoat layer on the opposite surface of the nonmagnetic support from that on which the magnetic layer is present. The backcoat layer desirably contains carbon black and/or an inorganic powder. The formula of the magnetic layer and/or the nonmagnetic layer can be applied for the binder and various additives used to form the backcoat layer. The thickness of the backcoat layer is desirably less than or equal to 0.9 μm, preferably 0.1 μm to 0.7 μm.

<Manufacturing Process>

(Fabrication of a Magnetic Tape in which a Servo Pattern is Formed)

The compositions for forming the magnetic layer, nonmagnetic layer, and backcoat layer (generally referred to as coating liquids) generally contain solvent in addition to the various components set forth above. The various organic solvents generally employed to manufacture particulate magnetic tapes can be employed as the solvent. The process of preparing the compositions for forming the various layers normally includes at least a kneading step, a dispersing step, and mixing steps conducted as needed before and after these steps. Each of the various steps can be divided into two or more stages. All of the starting materials employed in the present invention, such as the ferromagnetic powder, nonmagnetic powder, binder, various optionally added additives, and solvent can be added at the start of, or part way through, any step. The various starting materials can be divided up and added in two or more steps. For example, when preparing the magnetic layer-forming composition, the abrasive and the ferromagnetic powder are desirably separately dispersed. To manufacture a magnetic tape, known manufacturing techniques can be employed. In the kneading step, it is desirable to employ a device with a strong kneading force, such as an open kneader, continuous kneader, pressurizing kneader, or extruder. Details regarding these kneading processes are described in Japanese Unexamined Patent Publication (KOKAI) Heisei Nos. 1-106338 and 1-79274, which are expressly incorporated herein by reference in their entirety. Glass beads or some other dispersion bead can be employed to disperse the various layer-forming compositions. Dispersion beads of high specific gravity such as zirconia beads, titania beads, and steel beads, are suitable as the dispersion beads. A known dispersing device can be employed as the disperser. As set forth above, one desirable way to obtain a magnetic tape with a ΔSFD of less than or equal to 0.50 as calculated with Equation 1 is to intensify the dispersion conditions (for example, increase the period of dispersion, reduce the diameter and/or increase the fill ratio of the dispersion beads employed in dispersion). Reference can be made, for example, to Japanese Unexamined Patent Publication (KOKAI) No. 2010-24113, paragraphs 0051 to 0057, for details regarding methods of manufacturing magnetic tapes. Reference can be made to Japanese Unexamined Patent Publication (KOKAI) No. 2010-24113, paragraph 0052, in regard to orientation processing.

(Forming the Servo Pattern)

The above magnetic tape can have one or more data bands and one or more servo bands running in the longitudinal direction of the magnetic tape in the magnetic layer, and has one or more timing-based servo pattern on the servo band. An example of the configuration of the data band and servo band is given in Table 1. However, these are merely examples, and it suffices to dispose a data hand and a servo band in any configuration corresponding to the system of a magnetic tape device (generally referred to as a "drive"). Each data band has multiple data tracks. A timing-based servo pattern is formed on the servo band. FIG. 2 shows en example of the configuration of a timing-based servo band. Specific examples of the shape are given in FIG. 2 and FIGS. 6 to 8. However, these are merely examples. It suffices to form a timing-based servo pattern on the servo band in a shape and configuration corresponding to the system of a magnetic tape device. Any known technique can be applied without limitation, such as the configuration examples given in U.S. Pat. No. 5,689,384, FIGS. 4, 5, 6, 9, 17, and 20, for the shape and configuration of the timing-based servo pattern.

The servo pattern care be formed by magnetizing specific regions on the servo hand with a servo write head mounted on a servo writer. For example, a servo write head with a leakage magnetic field of 150 kA/m to 400 kA/m, desirably falling within a range of 200 kA/m to 400 kA/m, can be employed as the servo write head. The regions that are magnetized by the servo write head (positions where the servo pattern is formed) are determined by a standard. A commercial servo writer or a servo writer of known configuration can be employed as the servo writer. A known technique such as that described in Japanese Unexamined Patent Publication (KOKAI) 2011-175687 or U.S. Pat. No. 5,689,384 or 6,542,325, can be adopted without limitation for the configuration of the servo writer. The contents of the above publications are expressly incorporated herein by reference in their entirety.

Magnetic Tape Device

An aspect of the present invention relates to a magnetic tape device including the above magnetic tape, a magnetic head, and a servo head.

Details regarding the magnetic tape that is mounted in the above magnetic tape device are as set forth above. Since the magnetic tape has a timing-based servo pattern, when recording a magnetic signal and/or reproducing a signal that has been recorded on the data band by means of the magnetic head, while reading the pattern with the servo head, head tracking can be conducted by the timing-based servo method based on the servo pattern that is read to cause the magnetic head to follow the data track with high precision. An example of an indicator of head positioning precision is the position error signal (PES) based on the method set forth in Examples further below. PES is an indicator of the fact that the head is not running where it should be running even when head tracking is being conducted by a servo system in the course of a magnetic tape running in a magnetic tape device. The higher the value, the lower the head positioning precision by the servo system that is indicated. In the magnetic tape according to an aspect of the present invention, by achieving a difference $L_{99.9}-L_{0.1}$ by keeping the $\Delta SFD$ to less than or equal to 0.50, it is possible to achieve a PES of, for example, less than or equal to 9.0 m (for example, falling within a range of 7.0 to 9.0).

A known magnetic head that is capable of recording and/or reproducing a magnetic signal on a magnetic tape can be employed as the magnetic head mounted on the above magnetic tape device. The recording head and the reproduction head can be a single head, or can be separate magnetic heads. A known servo head that is capable of reading a servo pattern formed on the servo band of the above magnetic tape can be employed as the servo head.

For details regarding head tracking by a timing-based servo system, a known technique such as that described in U.S. Pat. Nos. 5,689,384, 6,542,325, or 7,876,421, can be applied without limitation. The contents of the above publications are expressly incorporated herein by reference in their entirety.

A commercial magnetic tape device will normally be equipped with a magnetic head and a servo head in accordance with the standard. A commercial magnetic tape device will normally be equipped with a servo control mechanism to permit head tracking by the timing-based servo system in accordance with the standard. The magnetic tape device according to an aspect of the present invention can be constituted, for example, by incorporating, the magnetic tape according to an aspect of the present invention into a commercial magnetic tape device.

EXAMPLES

The present invention will be described in greater detail below through Examples. However, the present invention is not limited to the embodiments shown in Examples. The "parts" and "percent (%)" indicated below denote "weight parts" and "weight percent (%)".

Example 1

1. Preparation of Alumina Dispersion (Abrasive Liquid)

To 100.0 parts of alumina powder (HIT-70 made by Sumitomo Chemical Co., Ltd.) with an alpha conversion rate of about 65% and a Brunauer-Emmett-Teller (BET) specific surface area of 30 $m^2/g$ were admixed 3.0 parts of 2,3-dihydroxynaphthalene (made by Tokyo Chemical Industry Co., Ltd.), 31.3 parts of a 32% solution (the solvent being a mixed solvent of methyl ethyl ketone and toluene) of polyester polyurethane resin (UR-4800 (polar group content: 80 meq/kg) made by Toyobo (Japanese registered trademark) having polar groups in the form of $SO_3Na$ groups, and 570.0 parts of a mixed solution with a 1:1 (weight) ratio of methyl ethyl ketone and cyclohexanone as solvent and the mixture was dispersed for 5 hours in a paint shaker in the presence of zirconia beads. Following dispersion, the dispersion and the beads were separated with a mesh to obtain an alumina dispersion.

2. Formula of the Magnetic Layer-Forming Composition

| (Magnetic liquid) | |
|---|---|
| Ferromagnetic hexagonal barium ferrite powder (see Table 1) | 100.0 parts |
| Polyurethane resin containing $SO_3Na$ (weight average molecular weight: 70,000; $SO_3Na$ groups: 0.2 meq/g) | 14.0 parts |
| Cyclohexanone | 150.0 parts |
| Methyl ethyl ketone | 150.0 parts |
| (Abrasive liquid) | |
| Alumina dispersion prepared in 1. above | 6.0 parts |
| (Silica sol) | |
| Colloidal silica (average particle size: 100 nm) | 2.0 parts |
| Methyl ethyl ketone | 1.4 parts |
| (Other components) | |
| Stearic acid | 2.0 parts |
| Butyl stearate | 6.0 parts |
| Polyisocyanate (Coronate (Japanese registered trademark) made by Nippon Polyurethane Industry Co., Ltd.) | 2.5 parts |
| (Solvent added to finish) | |
| Cyclohexanone | 200.0 parts |
| Methyl ethyl ketone | 200.0 parts |

3. Formula of Nonmagnetic Layer-Forming Composition

| Nonmagnetic inorganic powder: α-iron oxide Average particle size (average major axis length): 10 nm Average acicular ratio: 1.9 BET specific surface area: 75 $m^2/g$ | 100.0 parts |
|---|---|
| Carbon black Average particle size: 20 nm | 20.0 parts |

-continued

| | |
|---|---|
| Polyurethane resin containing SO₃Na (weight average molecular weight: 70,000; SO₃Na groups: 0.2 meq/g) | 18.0 parts |
| Stearic acid | 1.0 part |
| Cyclohexanone | 300.0 parts |
| Methyl ethyl ketone | 300.0 parts |

4. Formula of Backcoat Layer-Forming Composition

| | |
|---|---|
| Nonmagnetic inorganic powder: α-iron oxide<br>Average particle size<br>(average major axis length): 0.15 μm<br>Average acicular ratio: 7<br>BET specific surface area: 52 m²/g | 80.0 parts |
| Carbon black<br>Average particle size: 20 nm | 20.0 parts |
| Vinyl chloride copolymer | 13.0 parts |
| Polyurethane resin containing sulfonate groups | 6.0 parts |
| Phenylphosphonic acid | 3.0 parts |
| Cyclohexanone | 155.0 parts |
| Methyl ethyl ketone | 155.0 parts |
| Stearic acid | 3.0 parts |
| Butyl stearate | 3.0 parts |
| Polyisocyanate | 5.0 parts |
| Cyclohexanone | 200.0 parts |

5. Preparation of Various Layer-Forming Compositions

A magnetic layer-forming composition was prepared by the following method. The above magnetic liquid was prepared by dispersing the various components for 24 hours (bead dispersion) using a batch-type vertical sand mill. Zirconia beads having a bead diameter of 0.5 mmΦ were employed as the dispersion beads. The above sand mill was used to mix the above abrasive liquid and magnetic liquid that had been prepared with the other components (silica sol, other components, and solvents added to finish) and the mixture was bead dispersed for 5 minutes. The mixture was then processed for 0.5 minutes (ultrasonically processed) in a batch-type ultrasonic device (20 kHz, 300 W). Subsequently, filtering was conducted with a filter having an average pore diameter of 0.5 μm to prepare a magnetic layer-forming composition. A portion of the magnetic layer-forming composition that had been prepared was collected and the dispersed particle diameter, an indicator of dispersion of ferromagnetic powder, was measured by the method set thrill further below. The measured values are given in Table 1.

A nonmagnetic layer-forming composition was prepared by the following method. The various components excluding the stearic acid, cyclohexanone, and methyl ethyl ketone were dispersed for 24 hours in a batch-type vertical sand mill to obtain a dispersion. Zirconia beads having a bead diameter of 0.1 mmΦ were employed as the dispersion beads. Subsequently, the remaining components were added to the dispersion obtained and the mixture was stirred in a dissolver. The dispersion thus obtained was filtered using a filter having an average pore diameter of 0.5 μm to obtain a nonmagnetic layer-forming composition.

A backcoat layer-forming composition was prepared by the following method. The various components excluding the lubricants (stearic acid and butyl stearate), polyisocyanate, and cyclohexanone were kneaded in an open kneader and diluted. Subsequently, the mixture was subjected to 12 passes of dispersion processing, each pass comprising a retention time of 2 minutes with a rotor tip peripheral speed of 10 m/s and a bead fill rate of 80 volume % using zirconia beads with a bead diameter of 1 mmΦ in a horizontal-type bead mill disperser. The remaining components were then added to the dispersion obtained and the mixture was stirred in a dissolver. The dispersion thus obtained was filtered with a filter having an average pore diameter of 1 μm to prepare a backcoat layer-forming composition.

6. Fabrication of Magnetic Tapes

The nonmagnetic layer-forming composition prepared in 5, above was coated and dried on the surface of a polyethylene naphthalate support 5.0 μm in thickness to a dry thickness of 0.1 μm, after which the magnetic layer-forming composition prepared in 5, above was coated in a quantity calculated to yield a thickness upon drying of 70 nm. The magnetic layer-forming composition was dried without being orientation processed. Subsequently, the backcoat layer-forming composition prepared in 5, above was coated and dried to a dry thickness of 0.4 μm on the opposite surface of the polyethylene naphthalate support from that on which the nonmagnetic, layer and magnetic layer had been formed.

Subsequently, a surface smoothing treatment (calendaring treatment) was conducted with calendar rolls comprised solely of metal rolls at a rate of 100 m/min, a linear pressure of 300 kg/cm, and a calendar roll surface temperature of 100° C., after which the product was heat treated for 36 hours in an environment with an ambient temperature of 70° C. After the heat treatment, the product was cut to ½ inch (0.0127 meter) width to obtain a magnetic tape.

The thicknesses of the various layers set forth above were design thicknesses calculated from the manufacturing conditions.

7. Forming the Timing-Based Servo Pattern

A servo band was formed in a demagnetized state magnetic layer of the magnetic tape that had been fabricated and a servo pattern with a configuration and shape in accordance with the LTO Ultrium format was formed using a servo writer on the servo band that had been formed. The leakage magnetic field of the servo head mounted on the servo writer was the value given in Table 1.

A magnetic tape having a servo pattern with a configuration and shape in accordance with the LTO lithium format on the servo band and having a data band, servo band, and guide band with a configuration in accordance with the LTO Ultrium format on the magnetic layer was obtained.

7. Evaluation Methods (1) Measurement of the Dispersed Particle Diameter of the Ferromagnetic Powder in the Magnetic Layer-Forming Composition A portion of the magnetic layer-forming composition fabricated in 5, above was collected and a sample solution was prepared by dilution to ⅟50 based on weight with the organic solvents employed to prepare the magnetic layer-forming composition. The sample solution was measured with a light-scattering particle size distribution meter (LB500 made by Horiba) and the arithmetic average particle diameter was adopted as the dispersion particle diameter.

(2) Measurement of the Average Particle Size of the Ferromagnetic Powder

The average particle size of the ferromagnetic particles was determined by the method set forth above.

(3) Measurement of the Coercive Force Hc and the $\Delta SFD_{powder}$ of the Ferromagnetic Powder The $\Delta SFD_{powder}$ of the ferromagnetic powder specified by Equation 2 above and the coercive force Hc were measured at an applied magnetic filed of 796 kA/m (10 kOe) with a vibrating sample magnetometer (made by Toei-Kogyo Co., Ltd.).

(4) Measurement of the ΔSFD and Coercive Force in the Longitudinal Direction of the Magnetic Tape The ΔSFD specified by Equation 1 above and the coercive force in the longitudinal direction of the magnetic tape were measured at an applied magnetic field of 796 kA/m (10 kOe) with a vibrating sample magnetometer (made by Toei-Kogyo Co., Ltd.).

(5) Measurement and Calculation of Difference $L_{99.9}-L_{0.1}$

A magnetic force microscope in the form of a Dimension 3100 made by Bruker was employed in frequency modulation mode and an SSS-MFMR (with a nominal curvature radius of 15 nm) as employed as probe to conduct coarse measurement at a pitch of 100 nm over a measurement range of 90 μm×90 μm on the surface of the magnetic layer of the magnetic tape on which the servo pattern had been formed and a servo pattern (magnetized region) was extracted. The distance between the tip of the probe and the surface of the magnetic layer during magnetic force microscopic observation was 20 nm. Since live A burst servo patterns formed according to the LTO Ultrium format was contained within the measurement range, the five servo patterns were extracted.

Using the above magnetic force microscope and probe, the area near the boundary of the magnetized region and unmagnetized region was measured at a pitch of 5 nm and a magnetic profile was obtained for an edge downstream in the running direction for each servo pattern. Since the magnetic profile obtained was inclined by θ=12°, a rotational correction was made with analytic software to render θ=0°.

Measurements were made in three different spots on the surface of the magnetic layer. Each measurement range contained five A burst servo patterns.

Subsequently, difference $L_{99.9}-L_{0.1}$ was determined by the method set forth above using analytic software. MATLAB prepared by MathWorks was employed as the analytic software.

(5) Measurement of PES

For each of the magnetic tapes on which the above timing-based servo pattern was formed, the servo pattern was read with the verify head on the servo writer used to form the servo pattern. The verify head was a reading magnetic head for verifying the quality of the servo pattern formed on the magnetic tape. In the same manner as for the magnetic heads of known magnetic tape devices (drives), an element reading the position relative to the position of the servo pattern (pattern in the direction of width of the magnetic tape) was disposed. A known PES calculating circuit calculating the head position precision based on a servo system from the electric signal obtained by reading the servo pattern was connected to the verify head. The PES calculation circuit calculated as needed the displacement in the direction of width of the magnetic tape from the electric signal (pulse signal) that was inputted, and calculated the PES as a value obtained by applying a high-pass filter (cutoff: 500 cycles/m) to the temporal change information (signal) of this displacement. Applying this high-pass filter reduced the effect of physical vibration on the PES obtained, making it possible to more precisely evaluate the effect of location shifting of the edge shape of the servo pattern on head positioning precision.

Examples 2 to 7, Comparative Examples 1 to 9

Table 1 gives the ferromagnetic powders, bead dispersion times during preparation of the magnetic layer-forming composition, whether orientation processing was conducted, and the leakage magnetic field of the servo write head used to prepare the magnetic tapes of Examples 2 to 7 and Comparative Examples 1 to 9. For the servo write head, the stronger the leakage magnetic field, the greater the capacity to record the servo pattern. Three servo write heads with different leakage magnetic fields were employed in the Examples and Comparative Examples. Table 1 records the servo write head recording capacity in the order of lowest to highest leakage magnetic field as low, medium, or high.

For the items shown in Table 1 and where ferromagnetic metal powders were employed as the ferromagnetic powder, with the exception that kneading and dilution were conducted prior to dispersion by kneading the various components of the magnetic liquid in an open kneader, the magnetic tapes of the various Examples and Comparative Examples were fabricated and evaluated by the same methods as in Example 1.

In Table 1, BF is recorded when ferromagnetic hexagonal barium ferrite powder as employed as the ferromagnetic powder and MP is recorded when ferromagnetic metal powder was employed.

"None" is recorded in the orientation column when no orientation processing was conducted. "Perpendicular" is recorded when a magnetic field with a magnetic field intensity of 0.3 T was applied in a direction perpendicular to the coating surface to conduct a perpendicular orientation processing followed by drying while the magnetic layer-forming composition that had been coated was still wet. "Longitudinal" is recorded when a magnetic field with a magnetic field intensity of 0.3 T was applied in the longitudinal direction relative to the coating surface to conduct a longitudinal orientation processing while the magnetic layer-forming composition that had been coated was still wet.

The results of the above are given in Table 1.

TABLE 1

|  |  | Unit | Ex. 1 | Ex. 2 | Ex. 3 | Ex. 4 | Ex. 5 | Ex. 6 | Ex. 7 |
| --- | --- | --- | --- | --- | --- | --- | --- | --- | --- |
| Ferromagnetic powder | Type | — | BF | BF | BF | BF | BF | BF | MP |
|  | $\Delta SFD_{powder}$ | — | 0.20 | 0.30 | 0.10 | 0.10 | 0.80 | 0.10 | 0.10 |
|  | Hc | kA/m | 160 | 157 | 146 | 146 | 147 | 146 | 224 |
|  |  | Oe | 2011 | 1978 | 1840 | 1840 | 1850 | 1840 | 2820 |
|  | Average particle size | nm | 25 | 25 | 23 | 23 | 23.5 | 23 | 38 |
| Dispersion condition | Dispersion time | hours | 48 | 48 | 35 | 48 | 48 | 48 | 48 |
|  | Diameter of dispersion beads | nm | 20 | 20 | 50 | 20 | 20 | 20 | 20 |
| Orientation | — | — | None | Longitudinal | Longitudinal | Longitudinal | Longitudinal | Perpendicular | Perpendicular |
| Tape | Hc | kA/m | 165 | 165 | 158 | 158 | 160 | 138 | 156 |
|  |  | Oe | 2072 | 2072 | 1982 | 1982 | 2011 | 1734 | 1960 |
|  | $\Delta SFD$ | — | 0.48 | 0.21 | 0.16 | 0.05 | 0.33 | 0.48 | 0.45 |

TABLE 1-continued

| Servo write head | Servo write head recording capacity | — | Medium | Medium | Medium | Medium | Medium | Medium | Medium |
|---|---|---|---|---|---|---|---|---|---|
| | Leakage magnetic field | kA/m | 247 | 247 | 247 | 247 | 247 | 247 | 247 |
| | | Oe | 3100 | 3100 | 3100 | 3100 | 3100 | 3100 | 3100 |
| Servo pattern | $L_{99.9}$-$L_{0.1}$ | nm | 172 | 111 | 92 | 80 | 138 | 163 | 159 |
| Evaluation result | PES | nm | 8.4 | 8.6 | 8.3 | 8.2 | 8.4 | 8.1 | 8.7 |

| | | Unit | Comp. Ex. 1 | Comp. Ex. 2 | Comp. Ex. 3 | Comp. Ex. 4 | Comp. Ex. 5 |
|---|---|---|---|---|---|---|---|
| Ferromagnetic powder | Type | — | BF | MP | MP | BF | BF |
| | $\Delta SFD_{powder}$ | — | 0.30 | 0.80 | 0.80 | 0.30 | 0.30 |
| | Hc | kA/m | 188 | 224 | 224 | 170 | 166 |
| | | Oe | 2360 | 2810 | 2810 | 2130 | 2085 |
| | Average particle size | nm | 27 | 35 | 35 | 27 | 26.5 |
| Dispersion condition | Dispersion time | hours | 35 | 40 | 40 | 35 | 35 |
| | Diameter of dispersion beads | nm | 50 | 35 | 35 | 50 | 50 |
| Orientation | — | — | None | None | None | None | None |
| Tape | Hc | kA/m | 194 | 235 | 235 | 176 | 170 |
| | | Oe | 2440 | 2950 | 2950 | 2210 | 2130 |
| | $\Delta SFD$ | — | 0.82 | 0.79 | 0.79 | 0.84 | 0.84 |
| Servo write head | Servo write head recording capacity | — | Medium | Medium | High | Medium | Medium |
| | Leakage magnetic field | kA/m | 247 | 247 | 366 | 247 | 247 |
| | | Oe | 3100 | 3100 | 4600 | 3100 | 3100 |
| Servo pattern | $L_{99.9}$-$L_{0.1}$ | nm | 169 | 158 | 121 | 176 | 178 |
| Evaluation result | PES | nm | 8.6 | 8.7 | 8.4 | 8.6 | 8.9 |

| | | Unit | Comp. Ex. 6 | Comp. Ex. 7 | Comp. Ex. 8 | Comp. Ex. 9 |
|---|---|---|---|---|---|---|
| Ferromagnetic powder | Type | — | BF | BF | BF | BF |
| | $\Delta SFD_{powder}$ | — | 0.30 | 0.30 | 0.30 | 0.20 |
| | Hc | kA/m | 157 | 157 | 157 | 160 |
| | | Oe | 1978 | 1978 | 1978 | 2011 |
| | Average particle size | nm | 25 | 25 | 25 | 25 |
| Dispersion condition | Dispersion time | hours | 35 | 35 | 48 | 48 |
| | Diameter of dispersion beads | nm | 50 | 50 | 20 | 20 |
| Orientation | — | — | None | None | None | None |
| Tape | Hc | kA/m | 163 | 163 | 164 | 165 |
| | | Oe | 2052 | 2052 | 2063 | 2072 |
| | $\Delta SFD$ | — | 0.84 | 0.84 | 0.63 | 0.48 |
| Servo write head | Servo write head recording capacity | — | Medium | High | High | Low |
| | Leakage magnetic field | kA/m | 247 | 366 | 366 | 191 |
| | | Oe | 3100 | 4600 | 4600 | 2400 |
| Servo pattern | $L_{99.9}$-$L_{0.1}$ | nm | 272 | 263 | 198 | 228 |
| Evaluation result | PES | nm | 13.8 | 13.4 | 10.2 | 11.9 |

The fact that the PES determined by the above method was less than or equal to 9 nm meant that highly precise positioning of the recording head was possible by head tracking in a timing-based servo system.

A comparison of Comparative Examples 1 to 5 and Comparative Examples 6 to 9 reveals that in magnetic tapes in which the coercive force measured in the longitudinal direction was less than or equal to 167 kA/m, the phenomenon of the PES greatly exceeding 9 nm (a drop in head positioning precision) occurred. This drop in head positioning precision was determined to be difficult to inhibit by enhancing the recording capacity of the servo write head.

By contrast, in the magnetic tapes of Examples 1 to 7, the coercive force measured in the longitudinal direction was less than or equal to 167 kA/m, but the difference $L_{99.9}$–$L_{0.1}$ was kept to less than or equal to 180 nm. It was thus possible to achieve a PES of less than or equal to 9 nm, that is, enhance the head positioning precision in a timing-based servo system, by keeping the difference $L_{99.9}$–$L_{0.1}$ to less than or equal to 180 nm.

An aspect of the present invention is useful in the technical field of magnetic tapes for high-density recording.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises a magnetic layer comprising ferromagnetic powder and binder on a nonmagnetic support, wherein
a coercive force measured in a longitudinal direction of the magnetic tape is less than or equal to 167 kA/m;
a timing-based servo pattern is present on the magnetic layer; and
an edge shape of a portion of a servo pattern specified by observing the timing-based servo pattern with a magnetic force microscope is a shape in which a difference between a value $L_{99.9}$ of 99.9% cumulative distribution function of a width of misalignment from an ideal shape in the longitudinal direction of the magnetic tape and a value $L_{0.1}$ of 0.1% cumulative distribution function, $L_{99.9}-L_{0.1}$, is less than or equal to 180 nm.

2. The magnetic tape according to claim 1,
wherein the timing-based servo pattern is a linear servo pattern continuously or discontinuously running from one side to the other in a direction of width of the magnetic tape.

3. The magnetic tape according to claim 2,
wherein the timing-based servo pattern is a linear servo pattern inclined by an angle θ relative to the direction of width of the magnetic tape and running continuously from one side to the other side in the direction of width of the magnetic tape, and
the ideal shape is a linear shape running in a direction of angle θ.

4. The magnetic tape according to claim 3,
wherein a ΔSFD calculated with Equation 1:

$$\Delta SFD = SFD_{25°\,C.} - SFD_{-190°\,C.} \quad \text{Equation 1}$$

in the longitudinal direction of the magnetic tape is less than or equal to 0.50, and in Equation 1, $SFD_{25°\,C.}$ denotes a switching field distribution measured in the longitudinal direction of the magnetic tape in an environment with a temperature of 25° C., and $SFD_{-190°\,C.}$ denotes a switching field distribution measured in the longitudinal direction of the magnetic tape in an environment with a temperature of −190° C.

5. The magnetic tape according to claim 4,
wherein the ΔSFD is greater than or equal to 0.03 but less than or equal to 0.50.

6. The magnetic tape according to claim 2,
wherein a ΔSFD calculated with Equation 1:

$$\Delta SFD = SFD_{25°\,C.} - SFD_{-190°\,C.} \quad \text{Equation 1}$$

in the longitudinal direction of the magnetic tape is less than or equal to 0.50, and in Equation 1, $SFD_{25°\,C.}$ denotes a switching field distribution measured in the longitudinal direction of the magnetic tape in an environment with a temperature of 25° C., and $SFD_{-190°\,C.}$ denotes a switching field distribution measured in the longitudinal direction of the magnetic tape in an environment with a temperature of −190° C.

7. The magnetic tape according to claim 6,
wherein the ΔSFD is greater than or equal to 0.03 but less than or equal to 0.50.

8. The magnetic tape according to claim 1,
wherein a ΔSFD calculated with Equation 1:

$$\Delta SFD = SFD_{25°\,C.} - SFD_{-190°\,C.} \quad \text{Equation 1}$$

in the longitudinal direction of the magnetic tape is less than or equal to 0.50, and in Equation 1, $SFD_{25°\,C.}$ denotes a switching field distribution measured in the longitudinal direction of the magnetic tape in an environment with a temperature of 25° C., and $SFD_{-190°\,C.}$ denotes a switching field distribution measured in the longitudinal direction of the magnetic tape in an environment with a temperature of −190° C.

9. The magnetic tape according to claim 8,
wherein the ΔSFD is greater than or equal to 0.03 but less than or equal to 0.50.

10. The magnetic tape according to claim 1,
wherein the coercive force is greater than or equal to 119 kA/m but less than or equal to 167 kA/m.

11. A magnetic tape device,
which comprises a magnetic tape, a magnetic head, and a servo head, and
wherein the magnetic tape is a magnetic tape, which comprises a magnetic layer comprising ferromagnetic powder and binder on a nonmagnetic support, wherein
a coercive force measured in a longitudinal direction of the magnetic tape is less than or equal to 167 kA/m;
a timing-based servo pattern is present on the magnetic layer; and
an edge shape of a portion of a servo pattern specified by observing the timing-based servo pattern with a magnetic force microscope is a shape in which a difference between a value $L_{99.9}$ of 99.9% cumulative distribution function of a width of misalignment from an ideal shape in the longitudinal direction of the magnetic tape and a value $L_{0.1}$ of 0.1% cumulative distribution function, $L_{99.9}-L_{0.1}$, is less than or equal to 180 nm.

12. The magnetic tape device according to claim 11,
wherein the timing-based servo pattern is a linear servo pattern continuously or discontinuously running from one side to the other in a direction of width of the magnetic tape.

13. The magnetic tape device according to claim 12,
wherein the timing-based servo pattern is a linear servo pattern inclined by an angle θ relative to the direction of width of the magnetic tape and running continuously from one side to the other side in the direction of width of the magnetic tape, and
the ideal shape is a linear shape running in a direction of angle θ.

14. The magnetic tape device according to claim 13,
wherein a ΔSFD calculated with Equation 1:

$$\Delta SFD = SFD_{25°\,C.} - SFD_{-190°\,C.} \quad \text{Equation 1}$$

in the longitudinal direction of the magnetic tape is less than or equal to 0.50, and in Equation 1, $SFD_{25°\,C.}$ denotes a switching field distribution measured in the longitudinal direction of the magnetic tape in an environment with a temperature of 25° C., and $SFD_{-190°\,C.}$ denotes a switching field distribution measured in the longitudinal direction of the magnetic tape in an environment with a temperature of −190° C.

15. The magnetic tape device according to claim 14,
wherein the ΔSFD is greater than or equal to 0.03 but less than or equal to 0.50.

16. The magnetic tape device according to claim 12,
wherein a ΔSFD calculated with Equation 1:

$$\Delta SFD = SFD_{25°\,C.} - SFD_{-190°\,C.} \quad \text{Equation 1}$$

in the longitudinal direction of the magnetic tape is less than or equal to 0.50, and in Equation 1, $SFD_{25°\,C.}$ denotes a switching field distribution measured in the longitudinal direction of the magnetic tape in an environment with a temperature of 25° C., and $SFD_{-190°\ C.}$ denotes a switching field distribution measured in the longitudinal direction of the magnetic tape in an environment with a temperature of −190° C.

17. The magnetic tape device according to claim 16, wherein the $\Delta SFD$ is greater than or equal to 0.03 but less than or equal to 0.50.

18. The magnetic tape device according to claim 11, wherein a $\Delta SFD$ calculated with Equation 1:

$$\Delta SFD = SFD_{25°\ C.} - SFD_{-190°\ C.} \qquad \text{Equation 1}$$

in the longitudinal direction of the magnetic tape is less than or equal to 0.50, and in Equation 1, $SFD_{25°\ C.}$ denotes a switching field distribution measured in the longitudinal direction of the magnetic tape in an environment with a temperature of 25° C., and $SFD_{-190°\ C.}$ denotes a switching field distribution measured in the longitudinal direction of the magnetic tape in an environment with a temperature of −190° C.

19. The magnetic tape device according to claim 18, wherein the $\Delta SFD$ is greater than or equal to 0.03 but less than or equal to 0.50.

20. The magnetic tape device according to claim 11, wherein the coercive force is greater than or equal to 119 kA/m but less than or equal to 167 kA/m.

* * * * *